United States Patent [19]
Carbonnel

[11] 3,785,744
[45] Jan. 15, 1974

[54] CONDUCTION PUMP FOR CORROSIVE LIQUID METALS

[75] Inventor: Henri Carbonnel, Antony, France

[73] Assignee: Groupement Atomique Alsacienne Atlantique, Plessis Robinson, France

[22] Filed: Mar. 31, 1972

[21] Appl. No.: 240,215

[30] Foreign Application Priority Data
Mar. 31, 1971 France .............................. 71.11372

[52] U.S. Cl. ................................................. 417/50
[51] Int. Cl. .............................................. H02k 1/12
[58] Field of Search ........................ 310/11; 417/50

[56] References Cited
UNITED STATES PATENTS

| | | |
|---|---|---|
| 2,612,109 | 9/1952 | Wakefield .............................. 417/50 |
| 3,459,133 | 8/1969 | Scheffler ............................ 266/38 X |
| 3,215,871 | 11/1965 | Brill ....................................... 310/11 |
| 3,470,398 | 9/1969 | Mottram ............................... 310/11 |
| 3,660,701 | 5/1972 | Blattmann ............................ 310/11 |
| 2,386,369 | 10/1945 | Thompson ............................ 417/50 |

*Primary Examiner*—William L. Freeh
*Attorney*—Paul M. Craig et al.

[57] ABSTRACT

Conduction pump for corrosive liquid metals, which can be dismantled, whose body consists of modular elements made of refractory materials.

Each element comprises recesses corresponding to the various detachable components of the pump: magnetic circuits, electric coil, electrodes and duct. By including in the pump body several active modular elements, it is possible to increase very greatly the discharge height of the pump.

8 Claims, 2 Drawing Figures

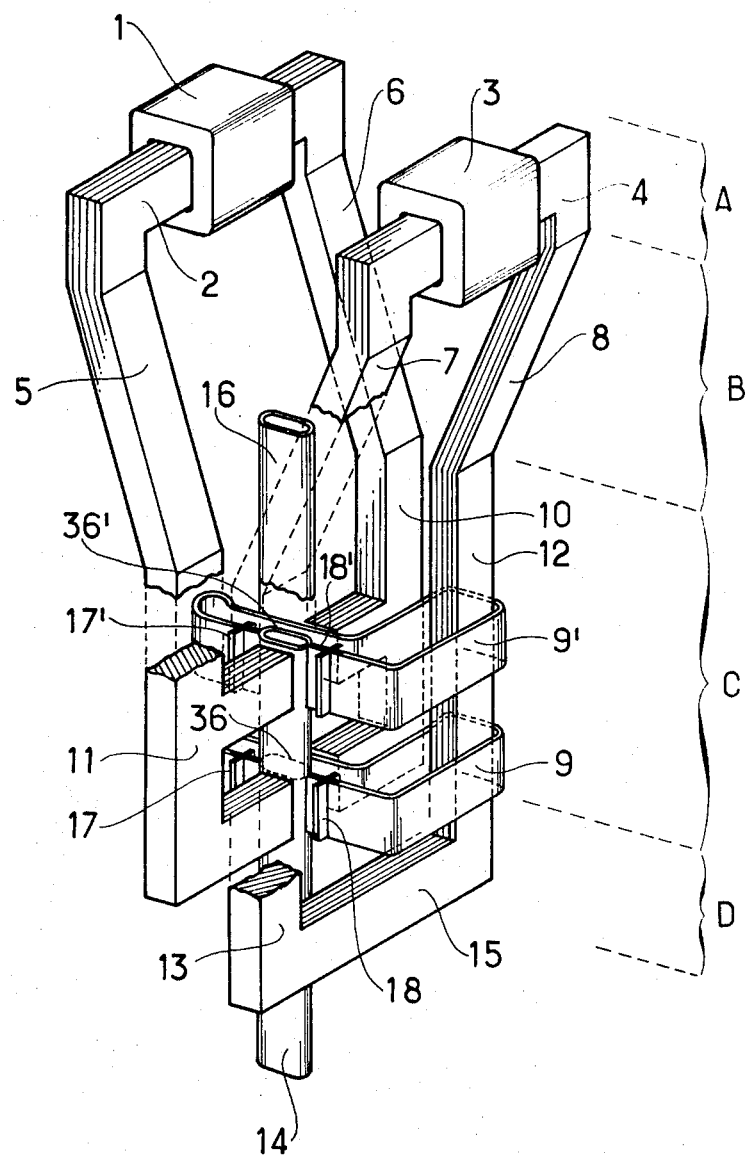

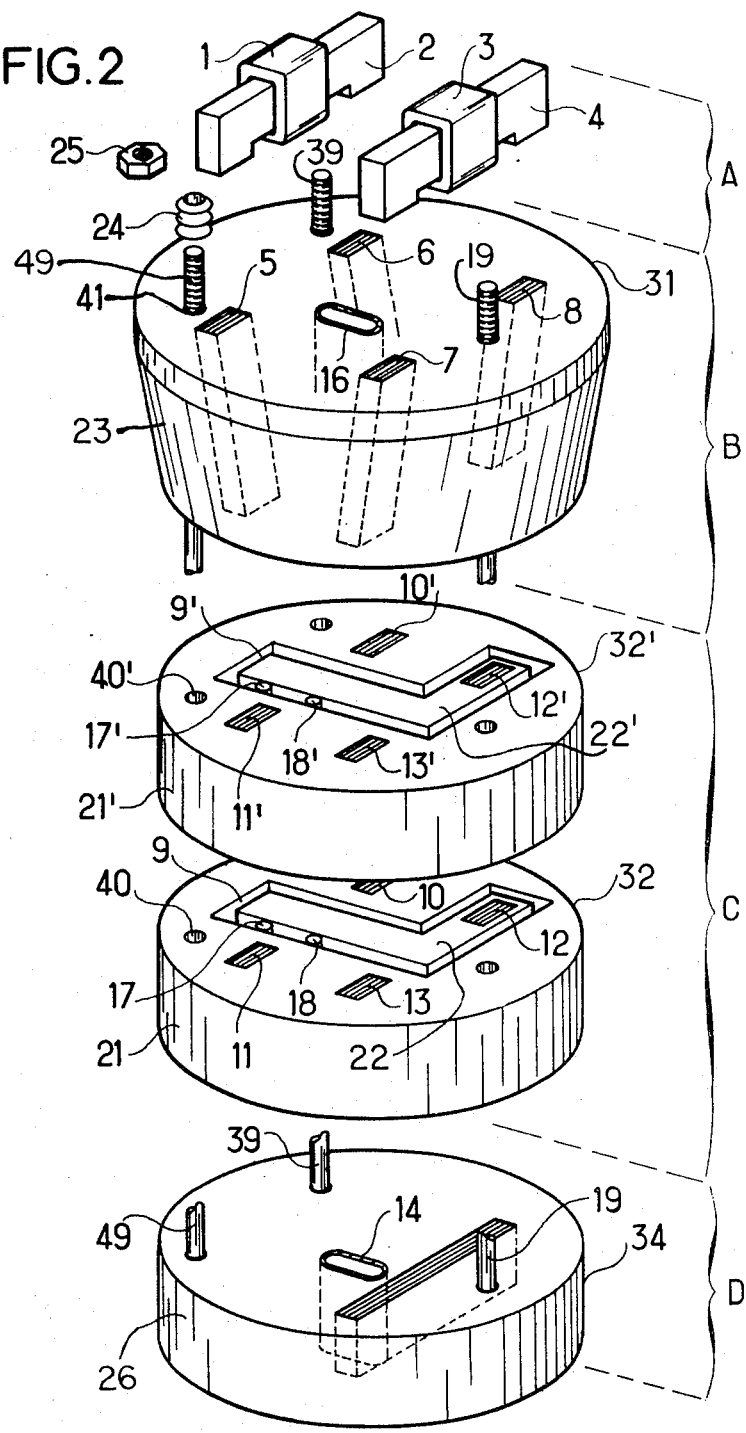

CONDUCTION PUMP FOR CORROSIVE LIQUID METALS

The present invention concerns the structure of a conduction pump for corrosive liquid metals whose body is formed by the assembling of modular elements made of refractory materials.

It is known that the term "conduction pump" designates a pump in which a liquid metal is set in motion by the electromagnetic force produced by the conjugate action of a magnetic induction of an electric current flowing between two opposite electrodes through the liquid metal flux.

It is also known that the manufacturing of such pumps for corrosive liquid metals has been hindered by technological problems resulting more particularly from the fact that when hot, corrosive liquid metals corrode current metals with which it would be possible to form massive electrodes used for making the electric current pass through the liquid metal flux. Moreover, the rare usual protective layers, which it would be possible to insert between the metal of the electrode and the liquid metal offer too high a resistance to the passing of the current for it to be possible to obtain efficient pumping in connection with prolonged resistance.

The applicant has nevertheless managed to produce such pumps by using more particularly electrodes made of very porous refractory material, in which is previously injected the corrosive liquid metal to be pumped, or a metal which mixes easily with the latter as described in U.S. application Ser. No. 235,271, filed on Mar. 16, 1972, in the name of the applicant.

The applicant has also managed to constitute immersion pumps based on the same principle, in which the active part of the pump and the duct are completely enveloped in a mass of cast refractory material. Such an immersion pump is described in U.S. application Ser. No. 235,278, filed on Mar. 16, 1972. The current which crosses the liquid metal flux is generated by induction in a coil itself consisting of corrosive liquid metal to be pumped. The electrical coil formed by a liquid metal duct extends into the air gap of an inductive magnetic circuit and closes across the porous electrodes soaked with liquid metal and across the liquid metal flux to be pumped. This electric coil has slight resistance and a very high current flows through it.

A device according to the previous application satisfies the applicant, but the refractory material forming the protective mass of the active part of the pump body must be cast finally and can be modified only with difficulty if the using conditions anticipated were to change as a function of new requirements of the users.

The applicant has therefore applied himself to the producing of a new device which can easily be dismantled and due to which it would, moreover, be possible to adapt the pumping height to the user's requirements without substantially modifying the pump output.

The object of the invention is therefore a conduction pump which can be dismantled, for corrosive liquid metals, which can be immersed in the said metals, having a discharge height which can be adapted on request, in which a main magnetic circuit generating an induction field in a section of the liquid metal crossed by a current induced by means of at least a secondary magnetic circuit and in which there is a pump body made of a refractory material whereas the portions of the magnetic circuits supporting the windings are held outside the refractory mass and are protected by a hood, characterized in that the pump body is formed by a certain number of detachable elements, crossed by the liquid metal duct, comprising a lower element provided with a recess for the base of the secondary magnetic circuit, one or several intermediate active elements in each of which are arranged recesses for the magnetic parts of the main circuit and of the secondary circuit, for the electrical coil and for its electrodes as well as an upper element comprising recesses for the columns of the two magnetic circuits which cross it and supporting, moreover, the protective hood of the windings.

The detachable elements are pressed by means of assembling braces which cross them, and of bolts. These detachable elements are separated by seals, for example, made of ceramic wool, providing fluid-tight sealing for the pump.

The maintenance, assembling, cleaning and changing facilities for worn parts afforded by pumps according to the present invention can easily be conceived. Moreover, it is easy to insert an extra active element in the pump, thus enabling the previous discharge height to be increased at will. Lastly, such a structure enables the selection of the active element enveloped in the most appropriate refractory material for each metal to be pumped.

The invention will be better understood on referring to the example of an embodiment described below, not having any limiting character, with reference to the two accompanying figures in which:

FIG. 1 is a perspective view of an induction pump bringing out the various distinct levels of a pump of this type.

FIG. 2 is an expanded view showing the various components of a pump body according to the invention.

FIG. 1 shows the dividing of the magnetic and electric circuits as well as of the liquid metal duct into four parts, A, B, C, D corresponding to four distinct levels in a particular case, which is frequent, where the main magnetic circuit is physically separated from the secondary magnetic circuit which induces an electric current into a coil.

In section A, the winding 1 of the main magnetic circuit can be seen mounted on a portion 2 of the main magnetic circuit. The winding of the secondary circuit is arranged at 3 on a portion 4 of the secondary magnetic circuit. These elements constitute the upper section of the pump protected by the hood against the heat and the radiation of the bath.

The section B situated below and constituting the upper section of the pump body comprises the columns 5 and 6 of the main magnetic circuit, and the columns 7 and 8 of the secondary circuit. The distance between the columns enables a space sufficient to allow the extension of the duct 16 to protrude to be arranged between the windings 1 and 3. This extension can be inclined in relation to the rest of the duct to leave the windings clear.

The following section C of the pump body is the active section where operations tending to subject the liquid metal contained in the portion of the duct 20 to electromagnetic forces which discharge that metal towards the top of the duct. The polar parts 10 and 11 of the main magnetic circuit, which generates a horizontal magnetic induction in the direction of the polar parts can also be distinguished; a current induced by the variation of the magnetic flux in the secondary magnetic columns 12 and 13 flows through the coil 9. This coil is extended by the electrodes 17 and 18 between which a horizontal current is established across the liquid metal section which is subjected, moreover, to the magnetic induction perpendicular to that current; the electromagnetic force which is generated in the duct 36 is directed along the third axis of a trirectangular trihedrom whose first two axes consist of the electric current and the magnetic induction.

It can easily be conceived that a second section identical to the preceding section could be inserted between the latter and the upper section of the pump body. A coil 9' identical to the coil 9 will be wound round the column 12. The metal contained in a duct 36' identical to the duct 36 will be subjected to equal electromagnetic forces so that the discharge height will reach almost twice what it was previously, on condition, however, that the induction remains the same (in the two active sections) and that the current induced in the second case keeps the same value as when a single coil was implemented.

This amounts to saying that to double approximately the discharge height, the ampere-turns of the winding 1 and of the winding 3 are doubled. The reluctance of the main circut is very high by reason of the losses of the air; the result that it is not necessary to double the section of that magnetic circuit uselessly.

The last section D of the pump body contains the base 15 of the secondary circuit and the element 14 of the liquid metal duct.

FIG. 2 is an example of an embodiment in which the pump body is divided into four elements comprising an upper element 31 in which may be distinguished the duct 16 and the recesses of the columns 5 and 6 of the primary circuit, 7 and 8 of the secondary circuit, cut or cast in a block of refractory material 23.

The active elements 32 and 32' are cast or machined in the refractory blocks 21 and 21'. The element 32 comprises the recesses of the parts 10 and 11 of the main circuit giving rise to the motor induction field, the recesses of the electrodes 17 and 18 and the positions for the polar parts 12 and 13. A part 22 is used to define the coil produced with the liquid metal conveyed by the pump and included between the block 21 and that part 22. The part 22 comprises moreover, the recess of the magnetic part 12. Centering pins position the part 22 in relation to the parts 32' and 34. It will also be noted that the electrodes 17 and 18 can consist of porous refractory material soaked with the metal to be pumped.

Likewise, the active element 32' cast or machined in the refractory block 21' comprises the recesses of the polar parts 10' and 11' and those of the electrodes 17' and 18'. Lastly, a part which is used to define the liquid metal coil comprised between the refractory block 21' and the part 22', can be seen at 22'.

Whereas it is desirable to produce the active elements 32 and 32' with the same refractory material, it can, on the contrary, be an advantage to produce the upper element 31 and the lower element 34, as well as the parts 22 and 22' with different refractory materials.

We have described a double active element formed by two superimposed electric coils. If necessary, other identical element can further be added in order to increase the discharge height. In other cases, on the contrary, a single active section will be found sufficient.

The lower element of the pump body 34 cut or cast in a block of refractory material 26 comprises, besides the recess for the base 15 of the secondary circuit and of the liquid metal duct 14, three assembling braces 19, 39 and 49, which have threaded ends; passages such as 40 in the block 32 or the passage 41 in the block 31 correspond to them in all the superimposable stages. An elastic system, such as a spring 24, enables the compensating of expansion differences between the braces, on the one hand, and the refractory blocks such as 31, 32, 32' and 34 on the other hand. The blocks are pressed together by screwing nuts 25 onto the braces. Seals consisting of sheets of ceramic wool or graphite paper of the PAPIEX type commercialized by Messrs. Carbone-Lorraine are inserted between the blocks.

In certain cases, the various blocks have been made of graphite previously treated against oxidization, ahd the electrodes 17 and 18 of porous graphite or porous ceramic material. But a pump body made of graphite, while being a great advantage in certain cases by reason of the mechanical and thermal qualities of that product, has proved itself unsuitable for use, on the contrary, in the pumping of metals, as it easily favors, when hot, the forming of a carbide having a higher melting point. The various elements in contact with the liquid metal and the outside surface of the pump body can then be covered with a layer or superficially soaked with a product which is inert with respect to the liquid metal conveyed.

The treatment of the graphite will, to great advantage, be effected by means of a phospho-aluminate which lines the porosities of the graphite with a layer of alumina which has the effect of considerably retarding the oxidization of that graphite. This treatment is completed by a superficial boron nitride treatment which prevents the liquid corrosive material from wetting the surface of the graphite, this having the effect of preventing the forming of a carbide and contributes, with the previous product, to preventing the superficial oxidization of the graphite.

But it is then also possible to choose another refractory material such as alumina, stabilized zirconium or a titanate, this material being agglomerated with a cement containing alumina, zirconate or silicate according to the corrosiveness of the liquid metal conveyed.

Although the device which has just been described seems to afford the greatest advantage for implementing the invention, it will be understood that various modifications can be made thereto without going beyond the scope of the invention, it being possible to replace certain elements by other equivalent elements and it being possible to replace certain compositions of refractory substances described above by other compositions of refractory substances acting in the same way and capable of fulfilling the same technical function therein.

What is claimed is:

1. A conduction pump for pumping corrosive liquid metals to a selectively adjustable discharge height and being immersible in said metals as well as capable of being dismantled comprising a duct for conveying said corrosive liquid metal, main magnetic circuit means including a first winding mounted on a first core member for producing an induction field at least at one section of said duct, secondary magnetic circuit means including a second winding mounted on a second core member for inducing a current in said liquid metal in said duct transverse to said induction field, a pump body formed of a plurality of detachable block-like elements made of refractory material mounted in stacked relationship with said duct being formed in aligned openings passing longitudinally therethrough, said detachable elements including a lower element provided with a recess for portions of said second core member of said secondary magnetic circuit means, at least one intermediate element having recesses for portions of said first core member of said main magnetic circuit means and other portions of said second core member said secondary magnetic circuit means and an upper element including recesses for other portions of said first core member of said main magnetic circuit means and of said second core member and secondary magnetic circuit means which pass therethrough.

2. A conduction pump for pumping corrosive liquid metals according to claim 1, wherein said detachable elements forming the pump body are assembled by means of braces embedded in the refractory material of said lower element and passing through the whole of said intermediate and upper elements, tightening and elastic compensation means engageable with said braces for securing said elements while permitting differential expansion between the elements and the braces.

3. A conduction pump for pumping corrosive liquid metals according to claim 2, wherein seals made of fibrous ceramic substances are inserted between said elements of the pump body.

4. A conduction pump for pumping corrosive liquid metals according to claim 3, wherein all of said elements of the pump body are made of the same refractory material.

5. A conduction pump for pumping corrosive liquid metals according to claim 3, characterized in that the elements of the pump body comprise one refractory material for the intermediate active element and a different refractory material for the upper element and lower elements.

6. A conduction pump for pumping corrosive liquid metals according to claim 3, wherein said elements of the pump body are made of different refractory materials.

7. A conduction pump for pumping corrosive liquid metals according to claim 3, wherein the various elements of the pump body are made of graphite superficially protected by a combined treatment with boron nitride and with a phospho-aluminate.

8. A conduction pump for pumping corrosive liquid metals according to claim 3, wherein the various elements of the pump body are made of a refractory material selected from the group consisting of alumina, stabilized zirconium and a titanate agglomerated with a cement containing aluminate, zirconate or silicate.

* * * * *